US009533369B2

(12) United States Patent
Oberndorfer et al.

(10) Patent No.: US 9,533,369 B2
(45) Date of Patent: Jan. 3, 2017

(54) PLUG PART AND SOCKET PART FOR DETACHABLY CONNECTING A PIPE ELBOW OF A WATER-COOLED WELDING TORCH AND CONNECTING DEVICE

(71) Applicant: Fronius International GmbH, Pettenbach (AT)

(72) Inventors: Klaus Oberndorfer, Vorchdorf (AT); Daniel Platzer, Wels (AT); Josef Raxendorfer, Steinerkirchen (AT); Sebastian Licht, Wels (AT)

(73) Assignee: Fronius International GmbH, Pettenbach (AT)

( * ) Notice: Subject to any disclaimer, the term of this patent is extended or adjusted under 35 U.S.C. 154(b) by 266 days.

(21) Appl. No.: 14/388,891

(22) PCT Filed: Mar. 6, 2013

(86) PCT No.: PCT/AT2013/050057
§ 371 (c)(1),
(2) Date: Sep. 29, 2014

(87) PCT Pub. No.: WO2013/142888
PCT Pub. Date: Oct. 3, 2013

(65) Prior Publication Data
US 2015/0114943 A1    Apr. 30, 2015

(30) Foreign Application Priority Data
Mar. 30, 2012   (AT) ............................... A 50115/2012

(51) Int. Cl.
*B23K 26/00*    (2014.01)
*B23K 15/00*    (2006.01)
(Continued)

(52) U.S. Cl.
CPC ................. *B23K 9/323* (2013.01); *H01R 9/11* (2013.01); *B23K 9/24* (2013.01)

(58) Field of Classification Search
CPC ............. B23K 9/32–9/326; B23K 9/24–9/287; H01R 9/11
(Continued)

(56) References Cited

U.S. PATENT DOCUMENTS 3,234,317 A    2/1966  Henderson
3,775,584 A  * 11/1973  Moerke ................. B23K 9/173
                                          219/137.62
(Continued)

FOREIGN PATENT DOCUMENTS

DE           889 768 C       9/1953
DE       2 243 924 A1        3/1974
(Continued)

OTHER PUBLICATIONS

International Search Report of PCT/AT2013/050057, mailed Aug. 5, 2013.
(Continued)

*Primary Examiner* — Sang Y Paik
(74) *Attorney, Agent, or Firm* — Collard & Roe, P.C.

(57) ABSTRACT

The invention relates to a plug part (21) for detachable connecting a torch neck (19) of a water-cooled welding torch (7) to a socket part (34) arranged on a hose package (20), having a cylindrical pipe element (22) with an axially running channel (23) for a welding wire (9) and a protective gas (5) and having at least two cooling channels (29, 30) for supplying and returning a cooling fluid, and a union nut (24) rotatably arranged on the pipe element (22), the union nut having an internal thread for connection to a mating external thread on the socket part (34), the invention further relating to such a socket part (34). In order to produce an optimal connection between the torch neck (19) and the hose package (20), a flange (25) having at least one receiving opening for receiving a pin-like element (36) of the socket part (34) is arranged on the pipe element (22) of the plug part (21) in
(Continued)

order to fix at least one angular position of the torch neck (19).

15 Claims, 6 Drawing Sheets

(51) Int. Cl.
    *B23K 9/32*     (2006.01)
    *H01R 9/11*     (2006.01)
    *B23K 9/24*     (2006.01)

(58) Field of Classification Search
    USPC .................. 219/136, 137 R, 137.2–137.63
    See application file for complete search history.

(56) References Cited

U.S. PATENT DOCUMENTS

| | | | | |
|---|---|---|---|---|
| 4,158,763 A | * | 6/1979 | Moerke | B23K 9/295 219/137.42 |
| 4,313,046 A | * | 1/1982 | Henry | B23K 9/285 156/294 |
| 4,549,068 A | * | 10/1985 | Kensrue | B23K 9/323 219/137.31 |
| 4,864,099 A | * | 9/1989 | Cusick, III | B23K 9/32 219/137.31 |

FOREIGN PATENT DOCUMENTS

| | | |
|---|---|---|
| DE | 34 20 821 C1 | 1/1988 |
| EP | 0 620 615 A2 | 10/1994 |
| GB | 1 403 225 A | 8/1975 |
| WO | 98/09765 A1 | 3/1998 |

OTHER PUBLICATIONS

Austrian Preliminary Office Action dated Oct. 18, 2012 in Austrian Application No. A 50115/2012 with English translation of the relevant parts.

\* cited by examiner

PLUG PART AND SOCKET PART FOR DETACHABLY CONNECTING A PIPE ELBOW OF A WATER-COOLED WELDING TORCH AND CONNECTING DEVICE

CROSS REFERENCE TO RELATED APPLICATIONS

This application is the National Stage of PCT/AT2013/050057 filed on Mar. 6, 2013, which claims priority under 35 U.S.C. §119 of Austrian Application No. A 50115/2012 filed on Mar. 30, 2012, the disclosures of which are incorporated by reference. The international application under PCT article 21(2) was not published in English.

The invention relates to a plug part for detachable connecting a torch neck of a water-cooled welding torch to a socket part arranged on a hose package if need be by interconnecting a torch housing, having a cylindrical pipe element with an axially running channel for a welding wire and a protective gas, and having at least two cooling channels for supplying and returning a cooling fluid, and a union nut rotatable arranged on the pipe element, said union nut having an internal thread for connection to a mating external thread on the socket part, wherein the orifice of the at least one cooling channel for supplying the cooling fluid is arranged separately.

Furthermore, the invention relates to a socket part for detachable connecting a hose package to a plug part arranged on a torch neck of a water-cooled welding torch, having an at least partially cylindrically formed end piece with an axially running channel for a welding wire and a protective gas and at least two cooling channels for supplying and returning a cooling fluid with appropriate orifices on the end piece, and an external thread for connection to a mating internal thread of a union nut of the plug part.

DE 2 243 924 and WO 98/09765 A1 describe connecting devices of welding torches comprising guides for a welding wire, for protective gas and for a cooling fluid with a plug part and a socket part of the subject type.

Finally, the invention relates to a connecting device for detachable connecting a torch neck of a water-cooled welding torch to a hose package, wherein the torch neck comprises an above-mentioned plug part and the hose package comprises an above-mentioned socket part, if need be by interconnecting a torch housing.

Usually, torch necks are detachable connected to the hose package or the torch housing and/or torch handle of a welding torch. This renders it possible for the welder to choose among torch necks of different design and to use the most suited one for performing the respective welding process, on the one hand, and to exchange the torch necks once it is damaged or contaminated, on the other hand. Usual connections between the torch neck and the hose package or torch housing are performed with appropriate threads or quick fasteners such as, for instance, bayonet fasteners. In addition to the necessary mechanical stability of the connection between the torch neck and the hose package and/or the torch handle or torch housing, the connection is also intended to ensure that substantially no protective gas will exits due to leakage. Since electrical energy is also transmitted via the connecting device, i.e. the plug part and the socket part, the connecting device is also intended to guarantee the appropriate electrical conduction. It is of advantage for welding if the torch neck is configured to be rotated at least within a certain range, so that the welding torch may always be held at an optimal angle to the welding seam intended. In the case of water-cooled welding torches it is to be prevented additionally that the cooling water exits from the socket part when the torch neck is detached. Furthermore, it is of disadvantage with conventional water-cooled welding torches that the cooling system has to be switched off once the torch neck is changed or just twisted.

The well-known connecting devices between the torch neck and the hose package and/or the torch housing of a welding torch frequently only meet with a part of the demands mentioned and are complex to handle.

It is therefore an object of the present invention to provide a plug part and a socket part of a connecting device for detachable connecting a torch neck of a water-cooled welding torch to a hose package by means of which it is possible to meet with the above-mentioned demands. The plug part and the socket part of such a connecting device are intended to be produced in a preferably simple and cost-efficient manner. Moreover, at least one angular position and/or reference position of the torch neck relative to the hose package or torch housing is intended to be set easily.

The object according to the invention is solved by an above-mentioned plug part, wherein the orifice of the one cooling channel is arranged on the outside of the cylindrical pipe element and the orifice of the other cooling channel is arranged on the inside of the cylindrical pipe element. Thus, an optimal separation of the orifices of the supplying and the returning cooling channels results. The orifice of the supplying cooling channel may be arranged on the outside and the orifice of the returning cooling channel may be arranged on the inside of the cylindrical pipe element, or vice versa. Such a design achieves a forced guiding of the cooling fluid in the plug portion and the associated torch neck and prevents the cooling fluid from reversing and flowing back to the cooling device before having reached the components to be cooled.

In accordance with one embodiment of the invention the orifice of the one cooing channel is arranged on the outside of the cylindrical pipe element of the plug part and the orifice of the other cooling channel is arranged on the inside of the cylindrical pipe element.

Preferably, a flange with at least one receiving opening for receiving a pin-like element of the socket part in order to fix at least one angular position of the torch neck is arranged on the cylindrical pipe element. If at least one receiving opening for receiving a pin-like element of the socket part in order to fix at least one angular position of the torch neck is arranged on the flange of the cylindrical pipe element, it is possible to generate sort of a reference position in at least one angular position of the torch neck. Starting out from this at least one reference position, the welder may move the torch neck to another desired angular position if required. If a plurality of receiving openings are provided for a pin-like element of the socket part, a plurality of reference positions may be set at particular angular distances which the welder may choose depending on the welding process. An appropriate marking on the plug part and, if need be, on the socket part, for instance, with appropriate notches or coloured markings, may be a simplification measure in this respect.

The object according to the invention is solved by an above-mentioned plug part, wherein a flange having at least one receiving opening for receiving a pin-like element of the socket part is arranged on the pipe element in order to fix at least one angular position of the torch neck. With respect to the advantages that may be achieved thereby, reference is made to the above paragraph.

The receiving opening is preferably formed by a bore. A bore that need not necessarily be a through bore, but may, for instance, be configured as a blind bore, is particularly simple and quick to produce.

If the union nut projects over the end of the pipe element and an abutment element is provided for preventing an axial shifting of the union nut beyond the end of the pipe element, the pipe element may be protected from damage or deformation.

A sliding ring of electrically conductive material may be arranged between the union nut and the flange of the pipe element. Such a sliding ring of electrically conductive material makes it possible to easily modify the angular position of the torch neck relative to the torch handle or the hose package without having to open the union nut completely. The electrically conductive material ensures that free power transmission from the hose package to the torch neck and subsequently to the contact nozzle is ensured.

The union nut has a diameter preferably decreasing toward the free end of the torch neck and may in particular have a frustoconical shape. Such a design facilitates the handling of the union nut and prevents and/or reduces corresponding edges between the union nut and the torch neck.

The union nut may have a plastic sheath. Such a plastic sheath of suitable material and in appropriate design, for instance, with axial grooves, also facilitates handling and produces both an electrical and a thermal insulation to the plug part of the welding torch positioned there below.

The object according to the invention is also solved by an above-mentioned socket part, wherein a connecting channel is provided in the end piece between the at least two cooling channels, said connecting channel being closed when the plug part is connected and being open when the plug part is disconnected. The connecting channel enables the returning of the cooling fluid to the cooling device when the plug part is decoupled or disconnected and thus prevents an exiting of the cooling fluid. The cooling channels in the socket part are arranged to mate with the above-mentioned separately arranged orifices in the plug part when the plug part and the socket part are connected, so that an optimal circuit for the cooling fluid is formed.

It is of further advantage if a pin-like element resiliently mounted in the direction of the plug part to be connected is provided, said pin-like element being receivable in at least one receiving opening in the plug part in order to fix at least one angular position of the torch neck. This makes it possible to produce a kind of snap connection between the plug part and the socket part in the at least one predetermined angular position or reference position. If, as described above, a plurality of receiving openings are arranged in the plug part at different angular positions, the pin-like element may snap in these different angular positions on the socket part so that particular positions of the torch neck may be marked.

The object according to the invention is also solved by an above-mentioned socket part, wherein a pin-like element resiliently mounted in the direction of the plug part to be connected is provided, said pin-like element being receivable in at least one receiving opening in the plug part in order to fix at least one angular position of the torch neck. With respect to the advantages that can be achieved thereby, reference is made to the foregoing paragraph.

The pin-like element preferably has a substantially hemispherical end. Such a design of the end of the pin-like element renders it possible for the pin-like element to be displaced easily when the torch neck is twisted relative to the socket part and another position may be assumed with the torch neck.

In accordance with a further feature of the invention, a connecting channel between the at least two cooling channels is provided in the end piece of the socket part, said connecting channel being closed when the plug part is connected and being open when the plug part is disconnected. Such a connecting channel between the at least two cooling channels in the socket part makes it possible to achieve a water stop when the torch neck is removed.

It is of advantage if a closing element resiliently mounted by a compression spring arranged around the channel is provided for closing the orifices of the at least two cooling channels on the end piece when the plug part is disconnected. This closing element ensures that no cooling water exits once the plug part is removed from the socket part.

The object according to the invention is also solved by a connecting device for detachable connecting a torch neck of a water-cooled welding torch to a hose package, if need be by interconnecting a torch housing, wherein the torch neck comprises a plug part with the above-mentioned features and the hose package comprises a socket part with the above-mentioned features. With respect to the advantages that can be achieved thereby, reference is made to the above description of the plug part and of the socket part.

The plug part is connected to the torch neck, preferably soldered. Such a connection is particularly quick and simple to perform. Alternatively, the connection may also be performed by pressing or gluing with appropriate glues.

The socket part is connected to the end of a hose package if need be by interconnecting a torch housing. The connection of the socket part to the end of the hose package or the torch housing may also be performed in different manners, particularly by gluing.

If the torch neck is adapted to be rotated by 360° relative to the hose package, wherein at least one angular position of the torch neck is fixed by the at least one receiving opening in the plug part and the pin-like element in the socket part, particular flexibility for all welding processes may be achieved.

In order to prevent that a torch neck of a water-cooled welding torch can be connected with the socket part to the torch housing or the hose package for a gas-cooled welding torch, the dimensions of the plug parts and of the socket parts of water-cooled welding torches and of gas-cooled welding torches are preferably of different design. Such a different design may, for instance, be achieved by different diameters of the union nut and the like.

Figure 1:
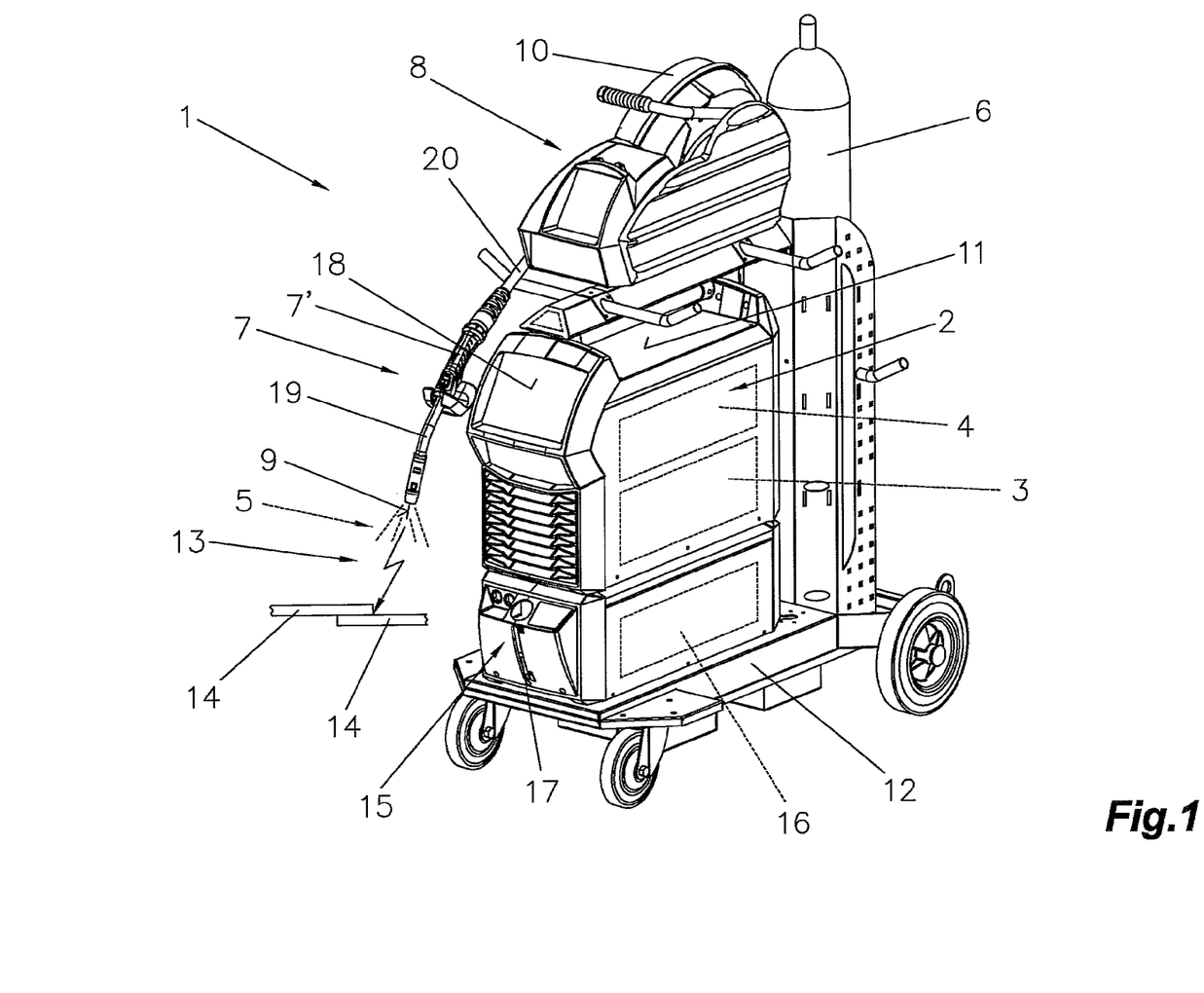
FIG. 1 a schematic illustration of a welding device.

The present invention will be explained in detail by means of the enclosed schematic drawings. There show:

FIG. 1 illustrates a welding device 1 for a wide variety of processes and/or methods, such as e.g. MIG/MAG, WIG/TIG, electrode, twin wire/tandem welding method, plasma or solder method, etc.

The welding device 1 comprises a current source 2 with a power unit 3 arranged therein, a control device 4 and further components and lines that are not illustrated, such as, for instance, a switching element, control valves, etc. The control device 4 is, for instance, connected to a control valve which is arranged in a supply line for a protective gas 5, for example $CO_2$, helium or argon and the like, between a gas tank 6 and a welding torch 7.

Moreover, a device 8 for supplying a welding wire 9 from a reservoir drum 10 and/or a wire roll to the region of the welding torch 7 may be controlled via the control device 4, as is, for instance, usual for MIG/MAG welding. It is to be understood that the supply device 8 may also be integrated in the welding device 1, in particular in the housing 11 of the current source 2 and not, as illustrated in FIG. 1, be positioned as an additional device on a carriage 12. The supplying device 8 for the welding wire 9 may also be mounted directly on the welding device 1, wherein the housing 11 of the current source 2 is designed on the top for receiving the supply device 8 and the carriage 12 may be omitted.

The welding wire 9 may be supplied by a supply device 8 also externally of the welding torch 7 to the process site, wherein a non-fusing electrode is preferably arranged in the welding torch 7, as is usual with WIG/TIG welding.

The current for forming an arc 13, in particular an operating arc, between the electrode and/or the welding wire 9 and a work piece 14 formed of one or several parts is supplied via a welding line (not illustrated) from the power unit 3 of the current source 2 to the welding torch 7, in particular the electrode and/or the welding wire 9. The work piece 14 to be welded is connected with the current source 2 via a further welding line (not illustrated) for the further potential, in particular a ground cable, so that a circuit for a process may be established through the arc 13 and/or a plasma jet formed. When using a torch with an internal arc 13, as may be the case with a plasma torch, the two welding lines are guided to the torch, so that an appropriate circuit may be established in the torch (not illustrated).

For cooling the welding torch 7, it is connected via a cooling device 15, interconnecting possible components such as, for instance, a flow controller, to a fluid container, in particular a water container 16 with a filling level indicator 17. On start-up of the welding torch 7 the cooling device 15, in particular a fluid pump used for the fluid contained in the water container 16, is started, so that cooling of the welding torch 7 is effected. As shown in the illustrated embodiment, the cooling device 15 is positioned on the carriage 12, and subsequently the current source 2 is placed thereon. The individual components of the welding device 1, i.e. the current source 2, the wire supply device 8, and the cooling device 15, are designed such that they have appropriate projections and/or recesses, so that they can be stacked or placed upon each other safely.

The welding device 1, in particular the current source 2, further comprises an input and/or output device 18 by which a wide variety of welding parameters, operating modes or welding programs of the welding device 1 may be set and/or selected and displayed. The welding parameters, operating modes or welding programs set by the input and/or output device 18 are transmitted to the control device 4 which subsequently triggers the individual components of the welding device 1 and/or predetermines appropriate nominal values for regulation or control.

In the illustrated embodiment the welding torch 7, comprising a torch neck 19 and if need be a torch housing 7', is connected to the welding device 1 via a hose package 20. The individual lines, such as, for instance, the supply line, lines for the welding wire 9, the protective gas 5, the cooling circuit, the data transmission, etc., from the welding device 1 to the welding torch 7 are arranged in the hose package 20, whereas the ground cable is preferably connected separately to the current source 2. The hose package 20 is preferably connected to the current source 2 or the supply device 8 via a coupling device that is not illustrated, whereas the individual lines in the hose package 20 are fastened to or in the welding torch 7. In order that an appropriate strain relief of the hose package 20 is ensured, the hose package 20 may be connected to the housing 11 of the current source 2 or the supply device 8 via a strain relief device (not illustrated). In order to enable an exchange of the torch neck 19 of the welding torch 7, it is connected via an appropriate connecting device to the hose package 20 or a torch housing 7' which is fastened to the hose package 20. The connecting device comprises a plug part 21 connected to the torch neck 19 of the welding torch 7 and a socket part 34 connected to the hose package 20 or a torch housing 7' connected to the hose package 20, which will be explained in detail by means of FIGS. 2 to 7.

Basically, it is not necessary to use and/or employ all the afore-mentioned components for the different welding methods and/or welding devices 1 such as, for instance, WIG devices, MIG/MAG devices or plasma devices. If the welding torch 7 is designed as a gas-cooled welding torch 7, the cooling device 15 may also be omitted. The welding device 1 is formed at least by the current source 2, the supply device 8 and if need be the cooling device 15, wherein these components may also be arranged in a joint housing 11. Further parts or components such as, for instance, a device for protection from grinding on the wire supply device 8 or an option carrier on a holding device for the gas tank 6, etc. may be arranged.

The embodiment of a welding device 1 illustrated in FIG. 1 constitutes just one of many possibilities. The welding devices 1 may vary in particular with respect to the supplying of the welding wire 9, the length of the hose package 20, the kind, position and number of supply devices 8 for the welding wire 9, the existence of a wire buffer (not illustrated) and much more.

Figure 2:
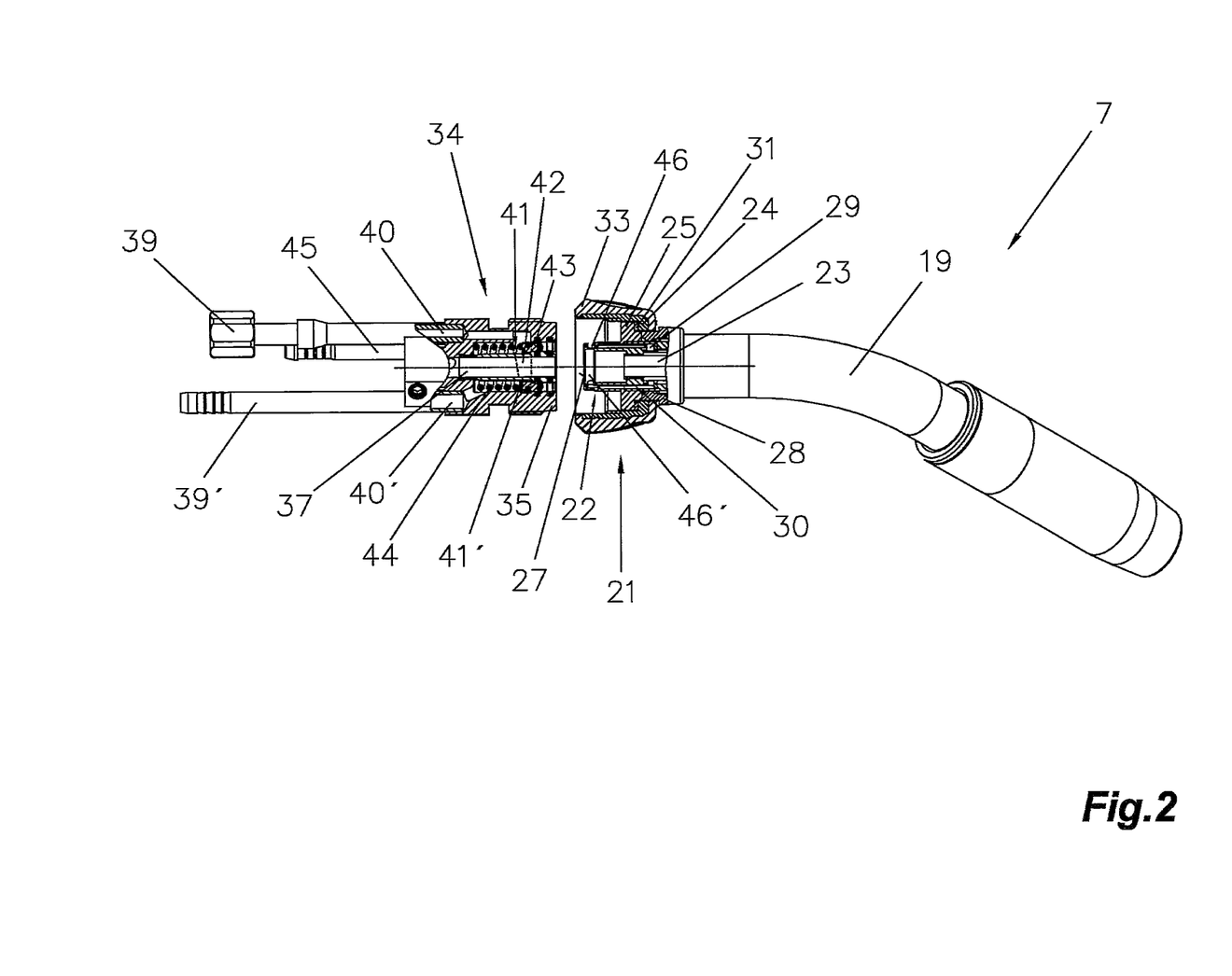
FIG. 2 a torch neck with a plug part and an associated socket part in a disconnected condition in a partially sectional view.

FIG. 2 illustrates a torch neck 19 with a plug part 21 and an associated socket part 34 in a disconnected condition in a partially sectional view. The plug part 21 is connected to the torch neck 19 of the welding torch 7, preferably soldered. The plug part 21 comprises a cylindrical pipe element 22 with an axially running channel 23 for a welding wire 9 and a protective gas 5 (not illustrated). At least two cooling channels 29, 30 for supplying and returning the cooling fluid to the torch neck 19 also run in the cylindrical pipe element 22. The cooling fluid is guided from the cooling device 15 via at least one cooling channel 29 in the plug part 21 to the places of the welding torch to be cooled in the region of the contact nozzle. There, the cooling fluid reverses and is transported back with the absorbed heat via the at least one cooling channel 30. Via appropriate cooling channels in the hose package 20 the cooling fluid is then again supplied to the cooling device 15 (see FIG. 1). The cooling channels 29, 30 end in appropriate orifices 46, 46' which, when the plug part 21 is connected to the associated socket part 34, coincide with orifices 41, 41' of the cooling channels 40, 40' in the socket part 34, so that free flow of the cooling fluid between the cooling device 15 and the contact nozzle of the welding torch 7 is ensured.

A union nut 24 is arranged rotatable on the pipe element 22 of the plug part 21, said union nut 24 comprising an internal thread adapted to be screwed on a mating external thread on a cylindrical end piece 35 of the associated socket part 34. In order to protect the end 27 of the pipe element 22 from deformation, it is of advantage if the union nut 24 projects over the end 27 of the pipe element 22 and if an abutment element 28 is provided which prevents an axial shifting of the union nut 24 beyond the end 27 of the pipe element 22. The plug part 21 comprises a flange 25 on which at least one receiving opening 26 may be provided in which an appropriately designed pin-like element 36 of the socket part 34 may be received (see FIG. 4). The mating of the positions of the pin-like element 36 of the socket part 34 and the receiving opening 26 on the plug part 21 fixes a particular angular position of the torch neck 19. If a plurality of receiving openings 26 are arranged, a plurality of angular positions of the torch neck 19 may be fixed. The receiving opening 26 is, in the simplest case, formed by a bore.

A sliding ring 31 of electrically conductive material may be arranged between the union nut 24 and the flange 25 of the pipe element 22. This sliding ring 31 facilitates the twisting of the torch neck 19 when the union nut 24 is loosened.

The union nut 24 may have a diameter decreasing in the direction of the free end of the torch neck 19 in the region of the contact nozzle and may substantially be of frusto-conical shape. This facilitates handling and prevents the existence of too large steps between the union nut 24 and the torch neck 19. Preferably, the union nut 24 has a plastic sheath 33 producing a thermal and electrical insulation.

The socket part 34 associated with the plug part 12 is connected to the hose package 20 or the torch housing 7' arranged on the hose package 20 via means that are not illustrated. The socket part 34 has an at least partially cylindrical end piece 35 and an axially running channel 37 for the welding wire 9 and the protective gas 5 (not illustrated). A line for supplying the protective gas 5 and running in the hose package 20 is connected via a connection 45. An external thread for connection to the mating internal thread of the union nut 24 of the plug part 21 is arranged on the end piece 35, so that the connection between the plug part 21 and the socket part 34 can be fixed appropriately. A resiliently mounted pin-like element 36 may be positioned at the front side of the end piece 35 of the socket part 34, said pin-like element 36 being adapted to project into at least one receiving opening 26 in the plug part 21 in order to fix at least one angular position of the torch neck 19 (see FIG. 4). The pin-like element 36 preferably comprises a substantially hemispherical end 38, so that it can easily be deflected from the receiving opening 26 on the flange 25 of the plug part 21 when the torch neck 19 is twisted.

At least two cooling channels 40, 40' for supplying and returning the cooling fluid run in the socket part 34. The cooling channels 40, 40' in the socket part are connected via appropriate connections 39, 39' to the lines for the cooling fluid running in the hose package 20 and leading to the cooling device 15. For connecting the cooling channels 40, 40' to the corresponding cooling channels 29, 30 in the plug part 21 when the plug part 21 and the socket part 34 are connected, the appropriate orifices 41, 41' of the cooling channels 40, 40' are positioned at the end of the end piece 35 of the socket part 34. When the plug part 21 and the socket part 34 are connected, the orifices 41, 41' coincide with the orifices 46, 46' of the cooling channels 29, 30 in the plug part 21, so that the cooling fluid may flow freely to the end of the welding torch 7. In order to establish a so-called water stop system, a connecting channel 42 exists between the cooling channels 40, 40' in the socket part 34, said connecting channel 34 being preferably closed by a closing element 43 when the plug part 21 has docked on the socket part 34. Since the connecting channel 42 extends in a ring-shaped manner around the channel 37 in the end piece 35 of the socket part 34, it cannot be seen in the illustrated sectional view and has therefore only been indicated. The closing element 43 may be pushed away from the connecting channel 42 by a compression spring 44 when the plug part 21 is removed from the socket part 34. Thus, the connecting channel 42 between the cooling channels 40, 40' is released and the cooling fluid is returned to the cooling device 15 via the connections 39, 39'. This prevents efficiently that cooling fluid exits from the socket part 34 when the torch neck 19 is rotated or decoupled. When the plug part 21 is connected to the socket part 34, the end 27 of the cylindrical pipe element 22 of the plug part 21 presses onto the closing element 43 and pushes it back against the force of the compression spring 43, whereupon the connecting channel 42 is closed and the cooling fluid may flow via the orifices 41, 41' to the orifices 46, 46' of the cooling channels 29, 30 in the plug part 21 and back again. It is important that the components of the plug part 21 and of the socket part 34 are dimensioned such that the connecting channel 42 is released as soon as the plug part 21 has been released from the socket part 34, so that no cooling fluid may exit from the socket part 34. On the other hand, even in the case of a loose connection of the plug part 21 to the socket part 34, that means with an opened or partially opened union nut 24, the flow of the cooling fluid from the cooling device 15 to the contact nozzle of the welding torch 7 is intended to be guaranteed. Even if the union nut 34 is loosened, for instance, in order to twist the torch neck 19, the cooling of the welding torch 7 is ensured and the exit of cooling fluid is prevented. Thus, it is possible to twist the torch neck 19 without interrupting the cooling circuit. This constitutes substantial handling ease for the welder who so far had to switch off the cooling prior to changing the position of the torch neck 19 and had to switch on the cooling again after fixing the torch neck in the new position.

In order to be able to offer optimal flexibility to the welder, the torch neck 19 of the welding torch 7 is adapted to be twisted preferably by 360°. For the purpose of twisting the union nut 24 is slightly loosened, so that the possible pin-like element 36 may be deflected from the receiving opening 26 and be twisted to the desired position. Then, the union nut 24 is tightened again, so that an optimal connection between the plug part 21 and the socket part 34 is created.

Figure 3:
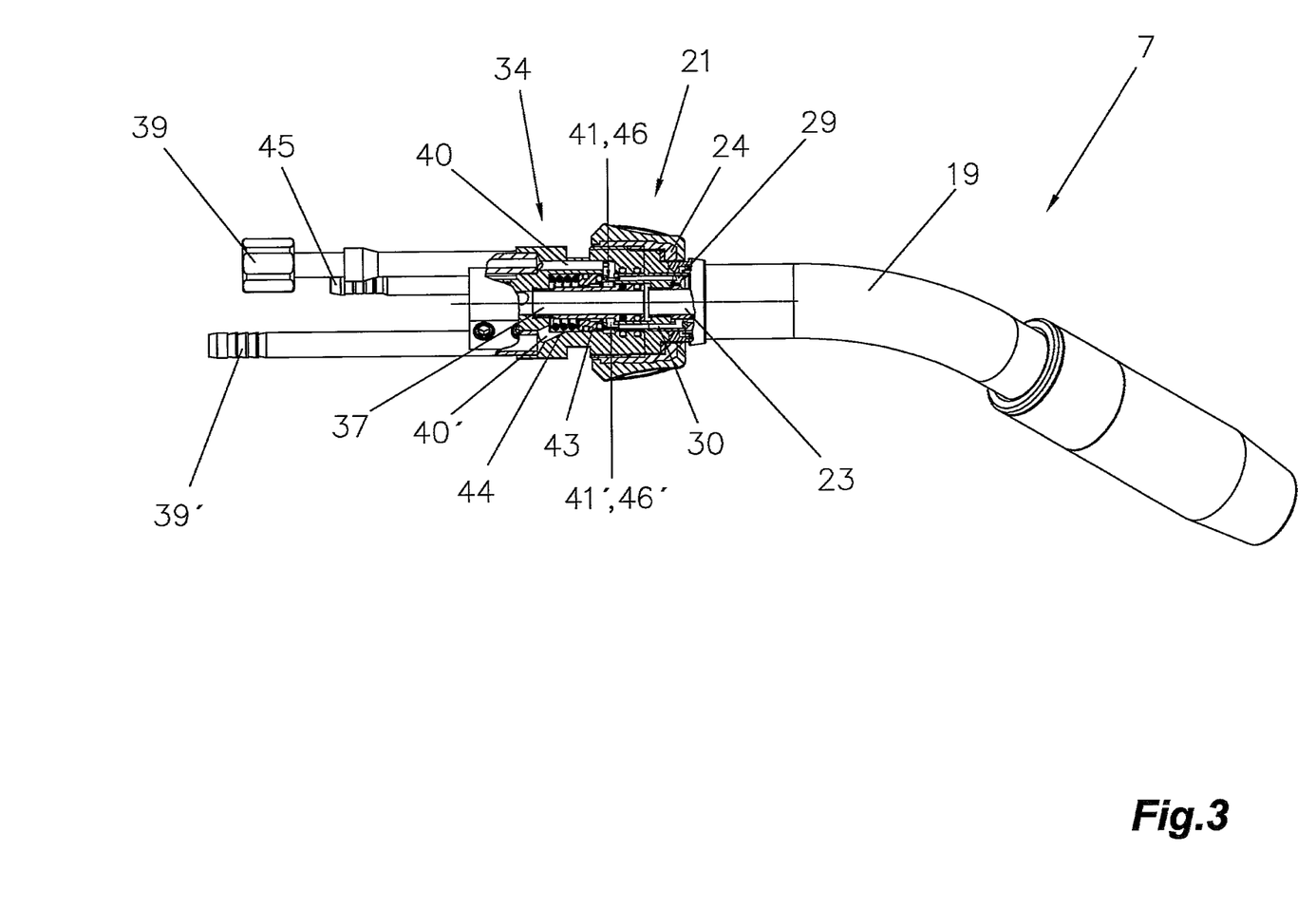
FIG. 3 the torch neck with the plug part and the socket part according to FIG. 2 in the connected condition in a partially sectional view.

FIG. 3 illustrates the torch neck 19 with the plug part 21 and the socket part 34 according to FIG. 2 in a connected condition and partially sectioned. In the illustrated position the closing element 43 is pushed against the compression spring 44 over the connecting channel 42, so that the cooling fluid can flow freely through the cooling channels 40, 40' in the socket part 34 and the cooling channels 29, 30 in the plug part 21 and can thus cool the welding torch 7 appropriately.

Figure 4:
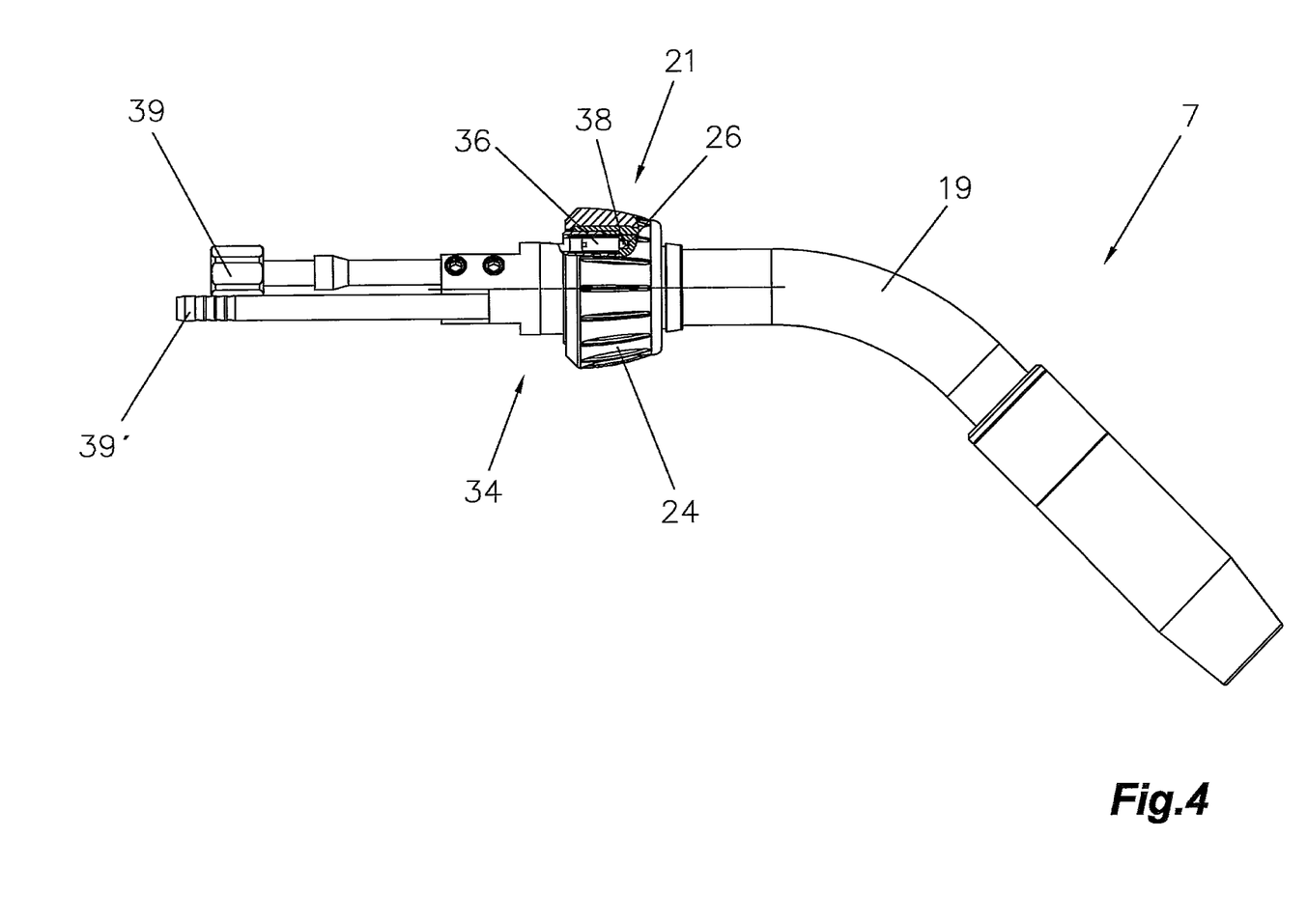
FIG. 4 the torch neck with the plug part and the socket part according to FIG. 2 in the connected condition in another position in a partially sectional view.

FIG. 4 illustrates the torch neck 19 with the plug part 21 and the socket part 34 according to FIG. 2 in the connected condition and in a partially sectional view in a position that is somewhat rotated versus FIG. 3 and in which the pin-like element 36 that has already been described can be seen on the socket part 34. In the illustrated position the torch neck 19 is in the fixed angular position in which the pin-like element 36 projects into the receiving opening 26 on the flange 25 of the plug part 25. As already mentioned, the pin-like element 36 preferably comprises a substantially hemispherical end 38, so that it can easily be deflected from the at least one receiving opening 26 on the flange 25 of the plug part 21 when the torch neck 19 is twisted. The union nut 24 or its plastic sheath 33, respectively, may be provided with axially running grooves or the like so as to facilitate handling of the union nut 24.

Figures 5, 6, 7:
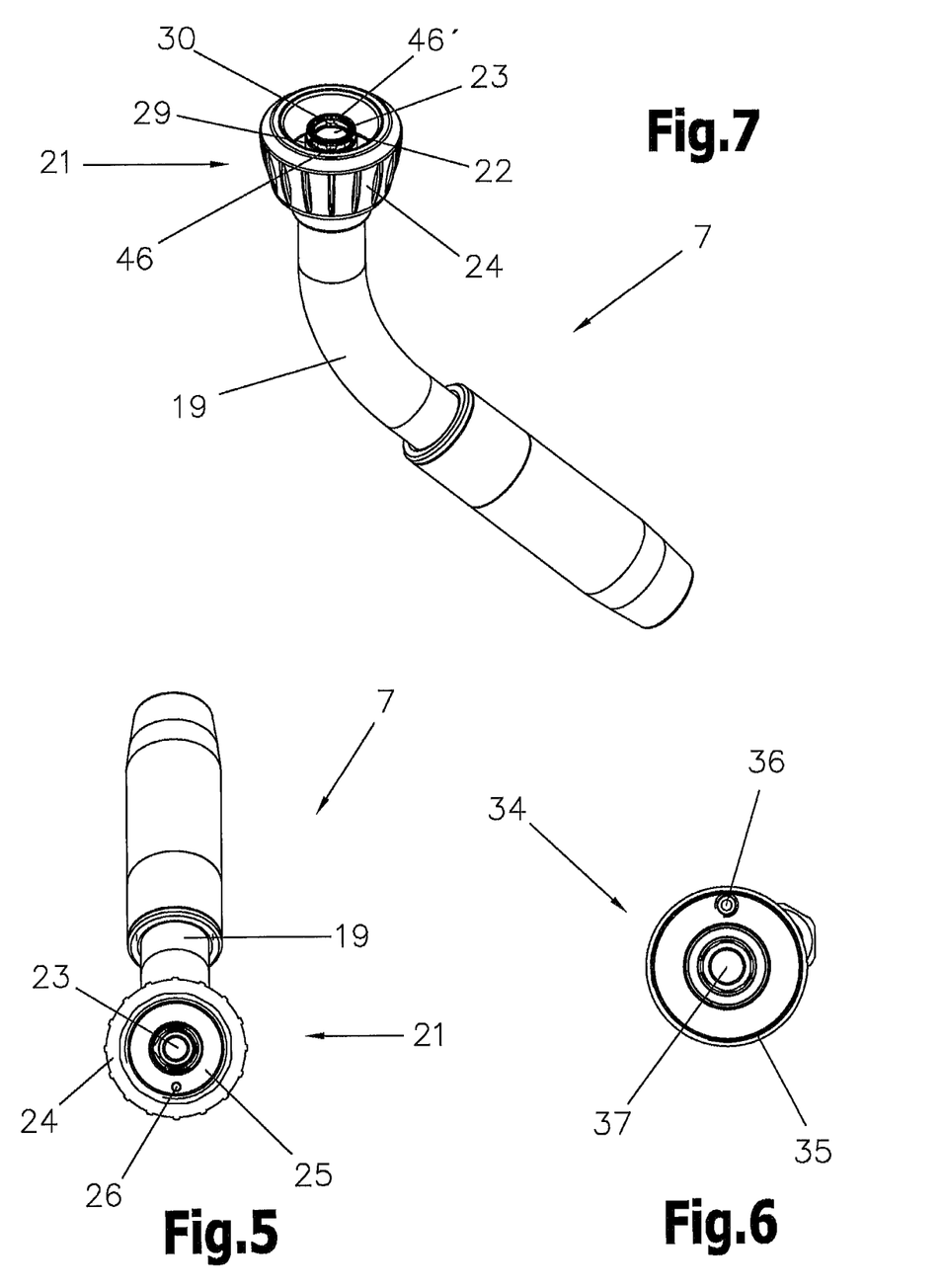
FIG. 5 a front view of the plug part connected to the torch neck according to FIGS. 2 to 4.
FIG. 6 a front view of the socket part according to FIGS. 2 to 4.
FIG. 7 a diagonal view of the plug part connected to the torch neck according to FIGS. 2 to 4.

From the front view of the plug part 21 connected to the torch neck 19 according to FIG. 5, the receiving opening 26 on the plug part 21 can be recognized. As already mentioned, a plurality of receiving openings 26 may also be arranged on the plug part 21 so as to create a plurality of reference positions for the torch neck 19.

FIG. 6 illustrates a front view of the socket part 34 from which the end piece 35 can be recognized. The pin-like element 36 resiliently mounted in the cylindrical end piece 35 and the channel 37 for the welding rod 9 and the protective gas 5 are also illustrated.

FIG. 7 illustrates a diagonal view of the plug part 21 connected to the torch neck 19. In addition to the channel 23 for the welding wire 9 and the protective gas 5, the union nut 24 and the cylindrical pipe element 22 of the plug part 21 are clearly recognizable. At least two cooling channels 29, 30 for supplying and returning the cooling fluid to the torch neck 19 run in the cylindrical pipe element 22. The orifices 46, 46' of these cooling channels 29, 30 are arranged such that a so-called forced guiding of the cooling fluid to the parts of the welding torch to be cooled is effected and a reversal of the cooling fluid in the region of the plug part 21 may be prevented. This is achieved in that the orifice 46 of the at least one cooling channel 29 for supplying the cooling fluid and the orifice 46' of the at least one cooling channel 30 for returning the cooling fluid are arranged in a staggered manner. The cooling channels 29, 30 may, for instance, be arranged to run coaxially to each other in the cylindrical pipe element 22 and the orifice 46 for the one cooling channel 29 may point radially outwardly, and the orifice 46' for the other cooling channel 30 may be arranged in axial direction (see also FIG. 8).

Figure 8:
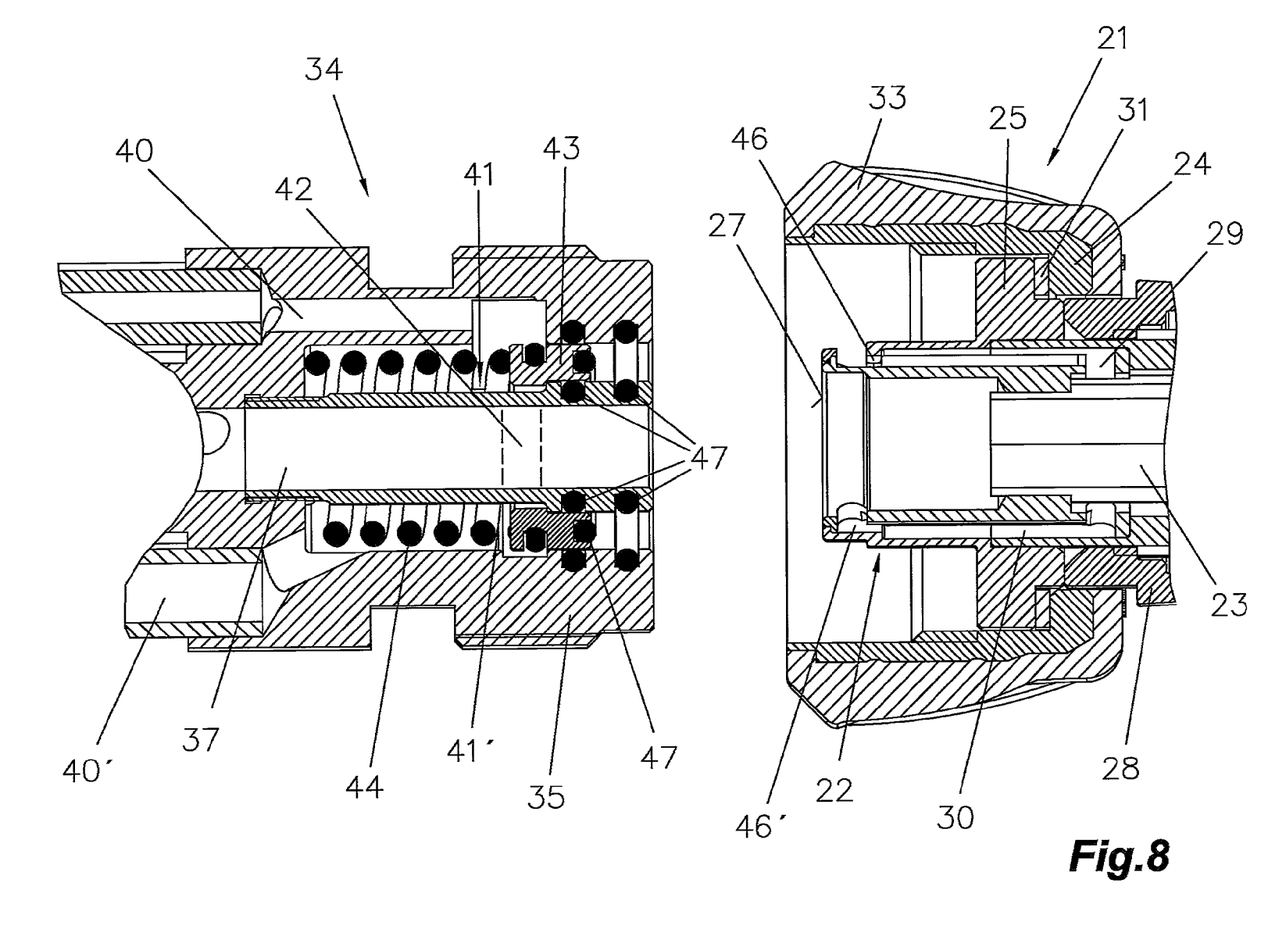
FIG. 8 the plug part and the socket part in a disconnected condition according to FIG. 2 in an enlarged view.

FIG. 8 finally illustrates the plug part 21 and the socket part 34 in a disconnected condition according to FIG. 2 in an enlarged illustration. In this respect, reference is made to the description of FIG. 2. As may be gathered from the enlarged illustration of FIG. 8, at least one sealing ring 47 may be arranged on the front side of the closing element 43 pointing in the direction of the plug part 21. Likewise, further sealing rings 47 may be arranged in the ring gap into which the cylindrical pipe element 22 of the plug part 21 is pushed during connection to the socket part 34. Thus, it is efficiently prevented that cooling fluid exits to the outside when the plug part 21 is disconnected from the socket part 34. It can be seen clearly that the two cooling channels 40 and 40' are arranged specifically in the socket part 34. The one cooling channel 40 is positioned outside of the annular space assumed by the compression spring 44 in the end piece while the other cooling channel 40' opens into the annular space in which the compression spring 44 is arranged. This specific arrangement achieves the connection to the cooling channels 29, 30 in the plug part 21 when the plug part 21 and the socket part 34 are connected without an exit of cooling fluid and without the risk of an unintended reversal of the cooling fluid before it has reached the components to be cooled in the welding torch 7.

At least two cooling channels 29, 30 for supplying and returning a cooling fluid are arranged on the plug part 21. The orifice 46 of the one cooling channel 29 for supplying the cooling fluid and the orifice 46' of the at least one cooling channel 30 for returning the cooling fluid are arranged separately. In detail, the orifice 46 of the one cooling channel 29 is arranged outside on the cylindrical pipe element 22 or points to the outside, respectively, while the orifice 46' of the other cooling channel 30 is arranged inside on the cylindrical pipe element 22 or points to the inside, respectively. When the plug part 21 is connected to the socket part 34, the closing element 43 is pushed back through the cylindrical pipe element 22 of the plug part 21 in the annular channel of the end piece 35 and the orifice 41 of the cooling channel 40 in the socket part 34 lies above the annular space at the end of the cylindrical pipe element 22 in which the outside orifice 46 of the cooling channel 29 on the cylindrical pipe element 22 of the plug part 21 is arranged. The orifice 41' of the other cooling channel 40' in the socket part 34, however, points in axial direction in the annular space of the end piece 35 outwardly to the orifice 46' of the other cooling channel which is arranged inside on the cylindrical pipe element 22 of the plug part 21. This separate arrangement of the orifices 46, 46' of the cooling channels 29, 30 in the plug part 21 may prevent that the cooling fluid reverses in the region of the connecting device already without having cooled the components in the welding torch 7. The illustrated staggered and/or separate arrangement of the orifices 46, 46' achieves the above-mentioned forced guiding of the cooling fluid.

If the union nut 24 is slightly loosened, the closing element 43 positioned in the annular space of the end piece 35 is pushed in the form of a tubular part by the compression spring 44 in the direction of the plug part 21, so that the connecting channel 42 is released and the cooling fluid is returned to the cooling device 15. Simultaneously, a flowing of the cooling fluid in the direction of the plug part is prevented by the appropriate construction of the closing element 43 and of the annular space in the end piece 35 since the closing element 43 prevents the exit of the cooling fluid along with the sealing rings 47. After the desired position of the torch neck 19 has been assumed and the union nut 24 has been tightened again, the closing element 43 is again in a position in which the connecting channel 42 is blocked and the annular space in the end piece 35 is released in the direction of the plug part. Thus, a quick change in position of the torch neck 19 or an exchange of the torch neck 19 is possible even without deactivating the cooling system of the welding device.

In order to prevent that inappropriate torch necks 19 can be connected to the socket part 34 of the connecting device, it is of advantage if the dimensions of the connecting device, for instance, for gas-cooled welding torches 7 and water-cooled welding torches, are chosen differently. Thus it can be prevented that a torch neck 19 for a gas-cooled welding torch 7 is connected to a hose package for a water-cooled welding torch, and vice versa.

The invention claimed is:

1. A plug part (21) for detachably connecting a torch neck (19) of a water-cooled welding torch (7) to a socket part (34) arranged on a hose package (20) if need be by interconnecting a torch housing (7'), the plug part comprising:
   a cylindrical pipe element (22) with an axially running channel (23) for a welding wire (9) and a protective gas (5),
   at least two cooling channels (29, 30) for supplying and returning a cooling fluid, and a union nut (24) rotatably arranged on the pipe element (22), said union nut (24) having an internal thread for connection to a mating external thread on the socket part (34), wherein the orifice (46) of the at least one cooling channel (29) for supplying the cooling fluid and the orifice (46') of the at least one cooling channel (30) for returning the cooling fluid are arranged separately, wherein the orifice (46) of the one cooling channel (29) is arranged on the outside of the cylindrical pipe element (22) and the orifice (46') of the other cooling channel (30) is arranged on the inside of the cylindrical pipe element (22).

2. The plug part (21) according to claim 1, wherein a flange (25) having at least one receiving opening (26) for receiving a pin-like element (36) of the socket part (34) is arranged on the pipe element (22) in order to fix at least one angular position of the torch neck (19).

3. The plug part (21) according to claim 2, wherein the receiving opening (26) is formed by a bore.

4. The plug part (21) according to claim 1, wherein the union nut (24) projects over the end (27) of the pipe element (22) and wherein an abutment element (28) is provided for preventing an axial shifting of the union nut (24) beyond the end (27) of the pipe element (22).

5. The plug part (21) according to claim 1, wherein a sliding ring (31) of electrically conductive material is arranged between the union nut (24) and the flange of the pipe element (22).

6. The plug part according to claim 1, wherein the union nut (24) has a diameter decreasing toward the free end of the torch neck (19) and is preferably of frustoconical shape.

7. The plug part (21) according to claim 1, wherein the union nut (24) comprises a plastic sheath (33).

8. A socket part (34) for detachably connecting a hose package (20) to a plug part (21) arranged at a torch neck (19) of a water-cooled welding torch (7), the socket part comprising:
  an at least partially cylindrically formed end piece (35) with an axially running channel (37) for a welding wire (9) and a protective gas (5),
  at least two cooling channels (40, 40') for supplying and returning a cooling fluid with appropriate orifices (41, 41') on the end piece (35), and
  an external thread for connection to a mating internal thread of a union nut (24) of the plug part (21),
  wherein a connecting channel (42) is provided in the end piece (35) between the at least two cooling channels (40, 40'), said connecting channel (42) being closed when the plug part (21) is connected and being open when the plug part (21) is disconnected.

9. The socket part (34) according to claim 8, wherein a pin-like element (36) resiliently mounted in the direction of the plug part (21) to be connected is provided, said pin-like element (36) being adapted to be received in at least one receiving opening (26) in the plug part (21) in order to fix at least one angular position of the torch neck (19).

10. The socket part (34) according to claim 9, wherein the pin-like element (36) has a substantially hemispherical end (38).

11. The socket part (34) according to claim 8, wherein a closing element (43) resiliently mounted by a compression spring (44) arranged around the channel (37) is provided for closing the orifices (41, 41') of the at least two cooling channels (40, 40') on the end piece (35) when the plug part (21) is disconnected.

12. A connecting device for detachably connecting a torch neck (19) of a water-cooled welding torch (7) to a hose package (20), wherein the connecting device comprises a plug part (21) according to claim 1 and a socket part (34) for detachably connecting the hose package (20) to the plug part, the socket part having an at least partially cylindrically formed end piece (35) with an axially running channel (37) for the welding wire (9) and the protective gas (5), and at least two cooling channels (40, 40') for supplying and returning a cooling fluid with appropriate orifices (41, 41') on the end piece (35), and an external thread for connection to the mating internal thread of the union nut (24) of the plug part (21), wherein a connecting channel (42) is provided in the end piece (35) between the at least two cooling channels (40, 40'), said connecting channel (42) being closed when the plug part (21) is connected and being open when the plug part (21) is disconnected.

13. The connecting device according to claim 12, wherein the plug part (21) is connected to the torch neck (19), preferably soldered.

14. The connecting device according to claim 12, wherein the socket part (34) is connected to the end of a hose package (20), if need be by interconnecting a torch housing (7').

15. The connecting device according to claim 12, wherein the torch neck (19) is adapted to be rotated by 360° relative to the hose package (20), wherein at least one angular position of the torch neck (19) is fixed by the at least one receiving opening (26) in the plug part (21) and the pin-like element (36) in the socket part (34).

* * * * *